United States Patent
Yamashita et al.

(10) Patent No.: US 8,228,629 B2
(45) Date of Patent: Jul. 24, 2012

(54) REACTION CONTROL CHARGE PUMP, CAPACITOR, AND TRANSISTOR TO POWER LEAD

(75) Inventors: Masaki Yamashita, Niiza (JP); Chisako Ota, Nerima-ku (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/730,846

(22) Filed: Mar. 24, 2010

(65) Prior Publication Data

US 2010/0315738 A1 Dec. 16, 2010

(30) Foreign Application Priority Data

Jun. 15, 2009 (JP) ................................. 2009-142561

(51) Int. Cl.
   *G11B 19/02* (2006.01)
   *G11B 21/02* (2006.01)
(52) U.S. Cl. .......................................... 360/71; 360/75
(58) Field of Classification Search .................. None
   See application file for complete search history.

(56) References Cited

U.S. PATENT DOCUMENTS

| | | | | |
|---|---|---|---|---|
| 4,831,469 A | * | 5/1989 | Hanson et al. | 360/75 |
| 4,866,554 A | * | 9/1989 | Stupeck et al. | 360/256.3 |
| RE34,399 E | * | 10/1993 | Gami et al. | 360/73.01 |
| 6,081,400 A | * | 6/2000 | Lu et al. | 360/75 |
| 6,141,173 A | * | 10/2000 | Kitazaki et al. | 360/75 |
| 2010/0067140 A1 | * | 3/2010 | Yamashita et al. | 360/75 |

* cited by examiner

*Primary Examiner* — K. Wong
(74) *Attorney, Agent, or Firm* — Lawrence J. Bassuk; W. James Brady; Frederick J. Telecky, Jr.

(57) ABSTRACT

The objective of this invention is to provide a motor control device, and a disk drive device using the same, in which during emergency operation it is possible to supply necessary power to the motor while limiting enlargement of the circuit area. During the retraction operation, control is performed to alternate between a short-circuit mode in which each terminal U, V, W of the spindle motor M1 is short-circuited to the terminal ICOM, and a rectifying mode in which the back electromotive force of the spindle motor M1 is rectifies and output to the power supply line ISO3V, VGND while the input of power from the power supply line ISO3V, VGND to the spindle motor M1 is blocked.

2 Claims, 7 Drawing Sheets

REACTION CONTROL CHARGE PUMP, CAPACITOR, AND TRANSISTOR TO POWER LEAD

FIELD OF THE INVENTION

This invention relates to a disk drive device, such as a hard disk drive device, equipped with an emergency head retracting function, and a motor control device used for control of the motors.

BACKGROUND OF THE INVENTION

Generally, a hard disk drive device has a spindle motor (SPM) for rotating a disk, a head for performing disk recording and playback, an arm attached to the front end of the head, and a voice coil motor (VCM) for moving the arm. When recording or playing back data, the head is carried to the desired positions on the disk by driving with the voice coil motor.

A minute distance is maintained between the head and the disk by utilizing the flow of air arising near the surface of the rotating disk. Therefore, a hard disk drive device mounted in mobile equipment generally has a function for preventing collision between the two. For example, in cases when abnormalities in power supply voltage, environmental temperature, disk rotation speed, etc., are detected, the operation of withdrawing (retracting) the head to a safety region called a ramp is executed.

The ramp has, from the side near the disk, a rising first inclined part, a horizontal part, and a falling second inclined part. In the event of retraction, the arm is moved by the voice coil motor such that the arm rides over the first inclined part and stops in a parking area beyond the second inclined part. Because it is also necessary to perform retraction after cutting off the power supply, power supply for the voice coil motor is provided, for example, from the voltage of a pre-charged capacitor for retraction, and from the rectified voltage of the back electromotive force (BEMF) of the spindle motor from inertial rotation.

Patent Reference 1 Specification of U.S. Pat. No. 7,301,722

Incidentally, in a conventional hard disk drive device, the method for control of the voice coil motor from the starting time to the ending time of the retraction operation involves switching according to preset values of a timer. Also, in this case, it is made such that the type of power supply (voltage of capacitor/rectified voltage of BEMF) used for driving of the voice coil motor is automatically switched when the preset time arrives.

However, because the capacitor voltage is decreased by discharge, when switching of the voice coil motor power supply according to set values of the timer, the capacitor voltage may, depending on conditions, decrease to nearly zero volts by the time of switching. In such a situation, the torque of the voice coil motor may decrease temporarily, and the power to draw the arm toward the ramp side may be weakened. Then there is a possibility that, when the arm moves toward the side of the disk, it will no longer be possible to draw the arm onto the ramp.

Therefore, in the conventional hard disk drive device, it has been necessary to make the capacitance of the capacitor large enough to handle the decrease in capacitor voltage, and therefore there were the disadvantages that the circuit area was large and the component cost was high.

This invention was made taking such circumstances into consideration, and its purpose is to provide a motor control device, and a disk drive device using same, in which it is possible to supply the necessary power to the motor during emergency operation while limiting enlargement of the circuit area.

SUMMARY OF THE INVENTION

The first aspect of this invention relates to a motor control device, which controls a first motor for rotating a disk-like recording medium and a second motor for moving a head to access information on said disk-like recording medium based on electric power supplied to a first power supply line and a second power supply line. The motor control device has: a first motor drive section, which includes plural transistors that connect said first power supply line and said second power supply line with plural input terminals of said first motor; and a first motor control section, which controls each transistor of said first motor drive section during an emergency operation to retract said head to a safety region, wherein it compares a back electromotive force generated in said plural input terminals of said first motor to the voltage of said first power supply line and the voltage of said second power supply line, and according to the result of that comparison, it blocks the input of electric power from said first power supply line and said second power supply line to said first motor, rectifies the back electromotive force generated by said first motor, and outputs this to said first power supply line and said second power supply line.

Optimally, said first motor control section during said emergency operation should alternate between a short-circuit mode in which each transistor of said first motor drive section is controlled so as to short-circuit all terminals of said first motor to said second power supply line, and a rectifying mode in which each transistor of said first motor drive section is controlled, according to the result of said voltage comparison, so as to block the input of electric power from said first power supply line and said second power supply line to said first motor, and to commutate the back electromotive force generated by said first motor and output it to said first power supply line and said second power supply line.

Optimally, said first motor control section should alternate between said short-circuit mode and said rectifying mode when the power supply voltage generated between said first power supply line and said second power supply line is below a prescribed threshold.

Optimally, said first motor drive section should include plural first transistors that connect said plural input terminals of said first motor and said first power supply line, and plural second transistors that connect said plural input terminals of said first motor and said second power supply line. Said first motor control section should include plural first transistor drive circuits, which plural first transistor drive circuits are for outputting drive signals of said plural first transistors, and which in said rectifying mode output drive signals for controlling the state of conduction of said first transistors as the driven objects according to the result of comparing the voltage at both ends of those first transistors as the driven objects, and in said short-circuit mode output drive signals to make those first transistors as the driven objects non-conducting, and plural second transistor drive circuits, which plural second transistor drive circuits are for outputting drive signals of said plural second transistors, and which in said rectifying mode output drive signals for controlling the state of conduction of said second transistors as the driven objects according to the result of comparing the voltage at both ends of those second transistors as the driven objects, and in said short-circuit mode output drive signals to make those second transistors as the driven objects non-conducting.

Optimally, said motor control device should have a signal selection circuit, which during normal operation inputs to said plural first transistors and said plural second transistors a drive signal group generated to supply electric power from said first power supply line and said second power supply line to said first motor, and during said emergency operation inputs to said plural first transistors and said plural second transistors a drive signal group generated by said plural first transistor drive circuits and said plural second transistor drive circuits.

Optimally, said motor control device should have: a detection section for detecting the speed of said head; a second motor drive section that generates a drive voltage having a polarity to accelerate or decelerate said head based on the power supply voltage of said first power supply line and said second power supply line, and that applies that generated drive voltage to said second motor; and a second motor control section, which in said emergency operation controls the polarity and output timing of said drive voltage according to the result of detection of said detection section such that said head approaches a prescribed speed.

Optimally, said detection section should detect the back electromotive force generated by said second motor during the period when said second motor drive section is not applying said drive voltage to said second motor.

Optimally, said first motor drive section should include plural first transistors that connect said plural input terminals of said first motor and said first power supply line, and plural second transistors that connect said plural input terminals of said first motor and said second power supply line. Said first motor control section should include plural first transistor drive circuits, which plural first transistor drive circuits are for outputting drive signals of said plural first transistors, and which output drive signals for controlling the state of conduction of said first transistors as the driven objects according to the result of comparing the voltage at both ends of those first transistors as the driven objects, and plural second transistor drive circuits, which plural second transistor drive circuits are for outputting drive signals of said plural second transistors, and which output drive signals for controlling the state of conduction of said second transistors as the driven objects according to the result of comparing the voltage at both ends of those second transistors as the driven objects.

Optimally, said motor control device should have a resistance circuit, which includes plural resistance elements that, during said emergency operation, connect the plural input terminals of said first motor, as well as a common terminal to which plural coils of said first motor are connected in common, to said second power supply line.

The disk drive device pertaining to the second aspect of this invention has: a first motor for rotating a disk-like recording medium; a second motor for moving a head for accessing information on said disk-like recording medium; and the motor control device pertaining to said first aspect.

The third aspect of this invention relates to a control circuit that uses a back electromotive force of a first motor, which is a three-phase DC motor for rotating a disk-like medium, to drive a second motor for moving a head with respect to said disk-like medium, and to control a retraction operation of said head. This circuit has a first motor drive section and a first motor control section. Said first motor drive section includes a first transistor connected between a first terminal of said first motor and a first voltage supply line, a second transistor connected between said first terminal and a second voltage supply line, a third transistor connected between a second terminal of said first motor and said first voltage supply line, a fourth transistor connected between said second terminal and said second voltage supply line, a fifth transistor connected between a third terminal of said first motor and said first voltage supply line, and a sixth transistor connected between said third terminal and said second voltage supply line. Said first motor control section includes a first transistor drive circuit that, in the head retraction mode, compares the voltage of said first terminal to the voltage of said first voltage supply line and controls the state of conduction of said first transistor according to the result of that comparison, a second transistor drive circuit that compares the voltage of said first terminal to the voltage of said second voltage supply line and controls the state of conduction of said second transistor according to the result of that comparison, a third transistor drive circuit that compares the voltage of said second terminal to the voltage of said first voltage supply line and controls the state of conduction of said third transistor according to the result of that comparison, a fourth transistor drive circuit that compares the voltage of said second terminal to the voltage of said second voltage supply line and controls the state of conduction of said fourth transistor according to the result of that comparison, a fifth transistor drive circuit that compares the voltage of said third terminal to the voltage of said first voltage supply line and controls the state of conduction of said fifth transistor according to the result of that comparison, and a sixth transistor drive circuit that compares the voltage of said third terminal to the voltage of said second voltage supply line and controls the state of conduction of said sixth transistor according to the result of that comparison. A voltage is generated between said first voltage supply line and said second voltage supply line by control of said first motor control section.

Optimally, said control circuit should also have a resistance circuit, which is connected to said first, second and third terminals of said first motor, a common terminal of said first motor, and said first or second voltage supply line. In said retraction mode, said control circuit should alternate between a short-circuit mode, in which said first, second and third terminals and said common terminal are connected to said first or second voltage supply line via said resistance circuit, and a rectifying mode, in which the states of conduction of said first through sixth transistors are controlled by said first through sixth transistor drive circuits of said first motor control section, and a voltage is generated between said first voltage supply line and said second voltage supply line.

Optimally, said control circuit should also have a capacitor connected between said first voltage supply line and said second voltage supply line, and a voltage sensing circuit for sensing said capacitor voltage. In said retraction mode, when said voltage sensing circuit senses that the voltage of said capacitor is less than or equal to a prescribed value, said first motor control section should control the states of conduction of said first through sixth transistors such that a voltage is generated between said first voltage supply line and said second voltage supply line.

REFERENCE NUMERALS AND SYMBOLS AS SHOWN IN THE DRAWINGS

In the figures M1 is a spindle motor, M2 is a voice coil motor, 10, 30 are motor drive sections, 12 is a retraction damping resistance section, 20, 22, 40, 42 are transistor drive sections, 201-206, 401-404 are gate drive circuits, 24, 44 are signal selection circuits, 50 is a retraction control section, 51 is a clock generation circuit, 52, 53 are transistor drive section, 54 is an analog-digital conversion circuit, 61 is a charge pump circuit, 62, 63 are regulator circuits, 64 is a clamping circuit, SW1-SW3, SW11-SW16, SW21-SW24 are switches, Tr1, Tr2 are transistors, C10-C12 are capacitors, D1 is a diode, R1-R5, RG are resistors, LU, LV, LW are coils

DESCRIPTION OF THE EMBODIMENT

According to this invention, it is possible to supply the necessary drive power to the motor during emergency operation while limiting enlargement of the circuit area.

Figure 1:
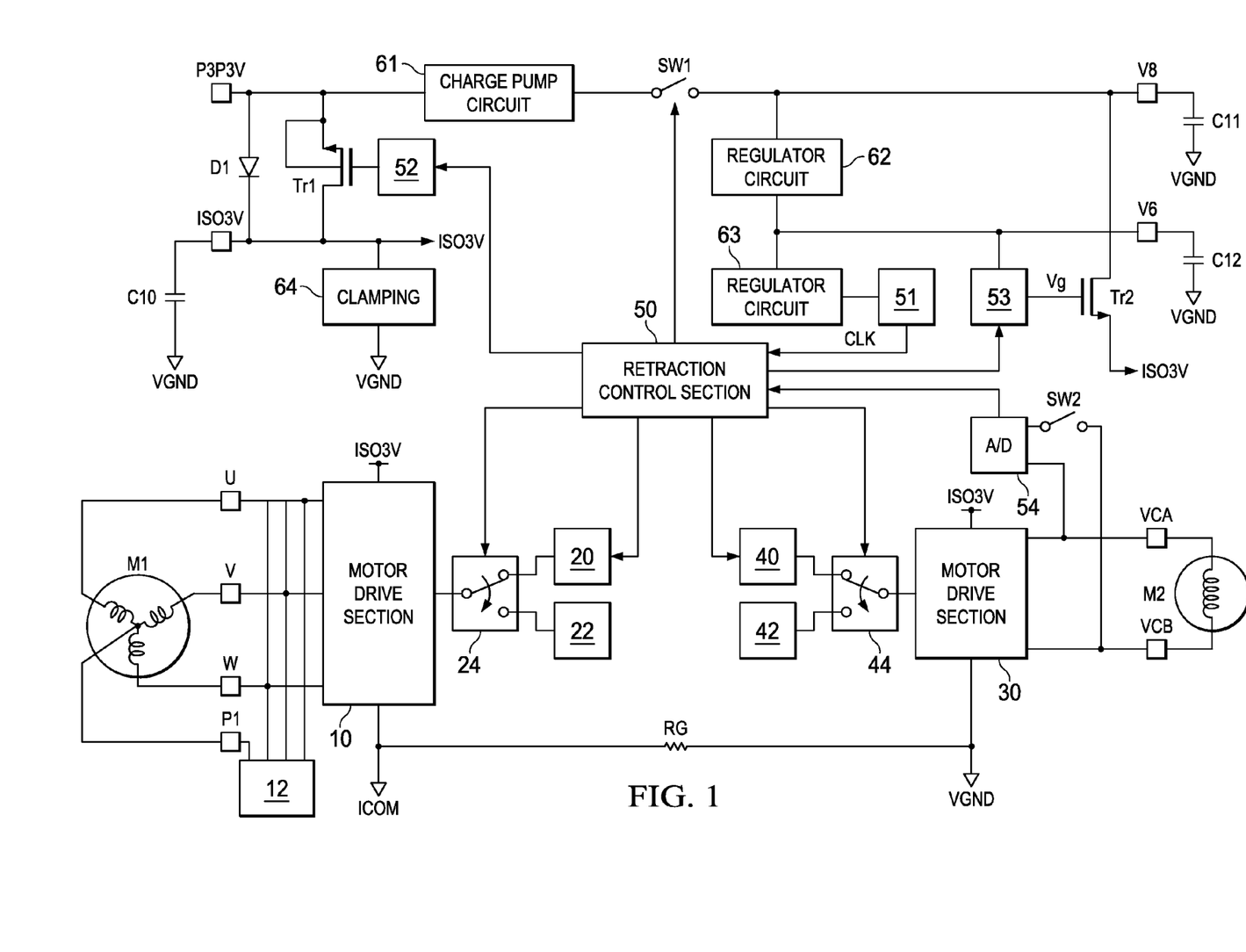
FIG. 1 is a drawing showing one example of the configuration of a disk drive device pertaining to an embodiment of this invention.

FIG. 1 is a drawing showing one example of the configuration of the disk drive device pertaining to a embodiment of this invention.

The disk drive device shown in FIG. 1 has a spindle motor M1, a voice coil motor M2, motor drive sections 10, 30, a retraction damping resistance section 12, transistor drive sections, 20, 22, 40, 42, signal selection circuits 24, 44, a retraction control section 50, a clock generating circuit 51, transistor drive circuits 52, 53, an analog-digital conversion circuit 54, a charge pump circuit 61, regulator circuits 62, 63, a clamping circuit 64, switches SW1, SW2, transistors Tr1, Tr2, capacitors C10-C12, a diode D1, and a resistor RG.

The spindle motor M1 is one example of the first motor in this invention.

The voice coil motor M2 is one example of the second motor in this invention.

The motor drive section 10 is one example of the first motor drive section in this invention.

The circuit including the transistor drive section 20 and the retraction control section 50 is one example of the first motor control section in this invention.

The signal selection circuit 24 is one example of the signal selection circuit in this invention.

The analog-digital conversion circuit 54 is one example of the detection section in this invention.

The motor drive section 30 is one example of the second motor drive section in this invention.

The circuit including the transistor drive section 40 and the retraction control section 50 is one example of the second motor control section in this invention.

The retraction damping resistance section is one example of the resistance circuit in this invention.

First, the circuits of the parts pertaining to driving and control of the spindle motor M1 in the disk drive device shown in FIG. 1 will be explained referring to FIG. 2.

The spindle motor M1 is rotates a disk-like recording medium such as a magnetic disk, and for example, it is a three-phase DC motor.

Figure 2:
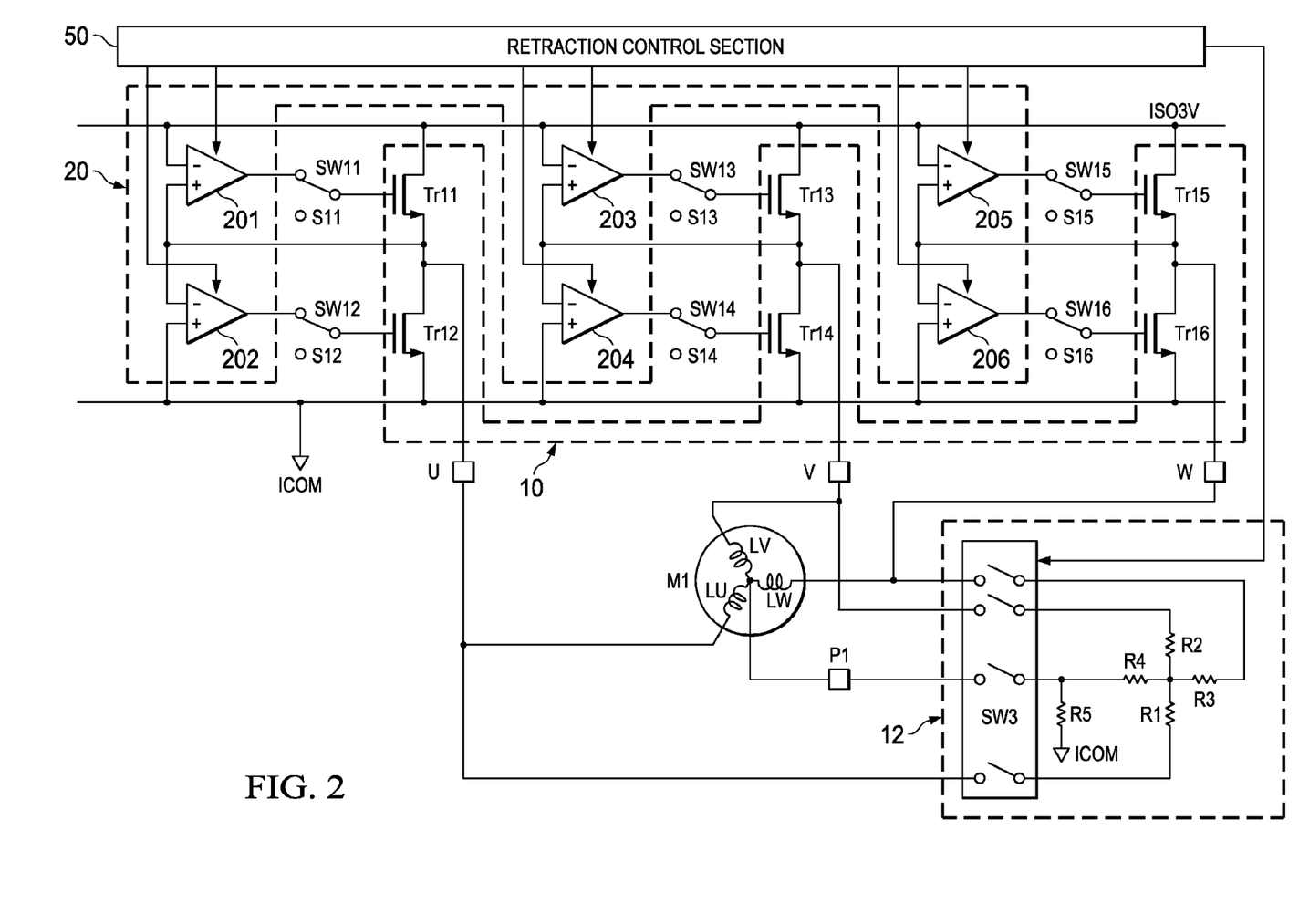
FIG. 2 is a drawing showing one example of the circuit configuration of the part pertaining to driving and control of the spindle motor in the disk drive device shown in FIG. 1.

As shown in FIG. 2, the spindle motor M1, for example has three coils LU, LV, LW. One end of each of the coils LU, LV, LW is connected to a common terminal P1. The other end of the coil LU is connected to a terminal U, the other end of the coil LV is connected to a terminal V, and the other end of the coil LW is connected to a terminal W.

The motor drive section 10 drives the spindle motor M1 based on electric power supplied from the power supply lines ISO3V, VGND. The spindle motor M1 is driven directly by voltage across power supply line ISO3V and power supply line ICOM connected to the power supply line VGND via the resistor RG.

The motor drive section 10, for example as shown in FIG. 2, has transistors Tr11-Tr16 such as n-type MOSFETs. The transistors Tr11-Tr16 control the electrical current paths between the terminals U, V, W and the power supply line ISO3V or the terminal ICOM according to gate drive signals input via the signal selection circuit 24 to be described later. The terminal ICOM is short-circuited to the ground line VGND via the electrical current detection resistor RG, which has a very small resistance value.

The transistor Tr11 is provided on a path connecting the terminal U to the power supply line ISO3V. The transistor Tr12 is provided on a path connecting the terminal U to the terminal ICOM. The transistor Tr13 is provided on a path connecting the terminal V to the power supply line ISO3V. The transistor Tr14 is provided on a path connecting the terminal V to the terminal ICOM. The transistor Tr15 is provided on a path connecting the terminal W to the power supply line ISO3V. The transistor Tr16 is provided on a path connecting the terminal W to the terminal ICOM.

The transistors Tr11, Tr13, Tr15 are examples of the first transistors in this invention, and the transistors Tr12, Tr14, Tr16 are examples of the second transistors in this invention.

During the retraction operation for retracting the head to the safety region, the transistor drive section 20 outputs drive signals for each gate of the transistors Tr11-Tr16 according to control by the retraction control section 50.

For example, the transistor drive section 20 switches between a mode (rectifying mode), which controls the transistors Tr11-Tr16 to commutate the back electromotive force of the spindle motor M1 and to output that rectified voltage to the power supply lines ISO3V, VGND (or ICOM), and a mode (short-circuit mode) which short-circuits all the input terminals U, V, W of the spindle motor M1 to the terminal ICOM according to control signals from the retraction control section 50.

When the transistor drive section 20 is set in the rectifying mode, the rectified voltage of the hack electromotive force of the spindle motor M1 is output to the power supply lines ISO3V, VGND.

On the other hand, when the transistor drive section 20 is set in the short-circuit mode, the electrical current generated by shorting the back electromotive force through the conductor resistance of each coil LU, LV, LW of the spindle motor M1 flows to the respective coils. When the short-circuit mode is released and the rectifying mode is set, a surge voltage is generated according to the electrical current flowing in each coil, and that surge voltage is rectified and output to the power supply lines ISO3V, VGND, and therefore a voltage higher than that during the rectifying mode is output to the power supply lines ISO3V, VGND.

As shown in FIG. 2, the transistor drive section 20 has, for example, gate drive circuits 201-206.

The gate drive circuit 201 outputs drive signals for the gate of the transistor Tr11. The gate drive circuit 202 outputs drive signals for the gate of the transistor Tr12. The gate drive circuit 203 outputs drive signals for the gate of the transistor Tr13. The gate drive circuit 204 outputs drive signals for the gate of the transistor Tr14. The gate drive circuit 205 outputs drive signals for the gate of the transistor Tr15. The gate drive circuit 206 outputs drive signals for the gate of the transistor Tr16.

In the rectifying mode, the gate drive circuits 201-206 compare the back electromotive force generated in the terminals U, V, W of the spindle motor M1 with the voltage of the power supply line ISO3V or the terminal ICOM. According to the result of the voltage comparison, the gate drive circuits 201-206 also output drive signals for linearly controlling the state of conduction/non-conduction of the transistors Tr11-Tr16 such that the back electromotive force generated by the spindle motor M1 is rectified and output to the power supply lines ISO3V, VGND, while the input of electric power from the power supply lines ISO3V, VGND to the spindle motor M1 is blocked.

That is, the gate drive circuits 201, 203, 205 compare the voltages between both ends of the transistors Tr11, Tr13, Tr15 as the driven objects, and when the voltage of the terminals U, V, W of the spindle motor M1 is higher than the voltage of the power supply line ISO3V, they output drive signals to control those transistors to make them conductive according to that voltage difference, and in the opposite case they output drive signals to make those transistors non-conductive.

Also, the gate drive circuits 202, 204, 206 compare the voltages between both ends of the transistors Tr12, Tr14, Tr16 as the driven objects, and when the voltage of the terminals U, V, W of the spindle motor M1 is lower than the voltage of the terminal ICOM, they output drive signals to control those transistors to make them conductive according to that voltage difference, and in the opposite case they output drive signals to make those transistors non-conductive.

As described above, in the rectifying mode the circuits constituted by each pair of transistors Tr11-Tr16 and the gate drive circuits 201-206 function as rectifying circuits in which the voltage values (resistance values) are controlled.

On the other hand, in the short-circuit mode, the gate drive circuits 201, 203, 205 output drive signals to make the transistors Tr11, Tr13, Tr15 as the driven objects non-conducting. Also, the gate drive circuits 202, 204, 206 output drive signals to make the transistors Tr12, Tr14, Tr16 as the driven objects conducting. In this way, the three terminals U, V, W of the spindle motor M1 are connected to the terminal ICOM.

The gate drive circuits 201-206, for example, function in the rectifying mode as regulation amplifiers which output gate control signals according to the result of comparison of input signals (voltage difference of comparative voltage).

During normal operation, the transistor drive section 22 outputs drive signals to the transistors Tr11-Tr16 according to control signals of a control section, not illustrated. The transistors Tr11-Tr16 turn on/off according to the drive signals of the transistor drive section 22, whereby electric power is supplied from the power supply lines ISO3V, VGND to the spindle motor M1, and the spindle motor M1 rotates.

During normal operation, the signal selection circuit 24 inputs drive signals S11-S16 generated by the transistor drive section 22 to the transistors Tr11-Tr16 of the motor drive section 10, and during the retraction operation, it inputs the drive signals generated by the gate drive circuits 201-206 of the transistor drive section 20 to the transistors Tr11-Tr16.

The signal selection circuit 24, for example as shown in FIG. 2, has switches SW11-SW16. The switch SW11 inputs the drive signals of the gate drive circuit 201 or the drive signals S11 of the transistor drive section 22 to the gate of the transistor Tr11. The switch SW12 inputs the drive signals of the gate drive circuit 202 or the drive signals S12 of the transistor drive section 22 to the gate of the transistor Tr12. The switch SW13 inputs the drive signals of the transistor drive circuit 203 or the drive signals S13 of the transistor drive section 22 to the gate of the transistor Tr13. The switch SW14 inputs the drive signals of the gate drive circuit 204 or the drive signals S14 of the transistor drive section 22 to the gate of the transistor Tr14. The switch SW15 inputs the drive signals of the gate drive circuit 205 or the drive signals S15 of the transistor drive section 22 to the gate of the transistor Tr15. The switch SW16 inputs the drive signals of the gate drive circuit 205 or the drive signals S16 of the transistor drive section 22 to the gate of the transistor Tr16.

The retraction damping resistance section 12 forms an electrical current path for suppressing the spike voltage generated when rectifying the back electromotive force of the spindle motor M1 in the retraction operation. That is, the retraction damping resistance section 12 forms a resistance circuit which connects the terminals U, V, W of the coils LU, LV, LW and the common terminal P1 during the retraction operation, whereby the spike voltage generated in the coils LU, LV, LW when the transistors Tr11-Tr16 are switched from on to off is suppressed.

The retraction damping resistance section 12, for example as shown in FIG. 2, has resistors R1, R2, R3 having one terminal connected to a common node, and resistors R4 and R5 connected directly between this common node and the terminal ICOM.

The other terminal of the resistor R1 is connected to the terminal U via a switch circuit SW3. The other terminal of the resistor R2 is connected to the terminal V via the switch circuit SW3. The other terminal of the resistor R3 is connected to the terminal W via the switch circuit SW3. The node connecting the resistors R4 and R5 is connected to the common terminal P1 via the switch SW3.

The switch SW3 includes plural switches which turn on according to control signals of the control section 50 during the retraction operation. When each switch of the switch SW3 turns on, a path is formed of electrical current flowing from the terminals U, V, W of the spindle motor M1 to the common terminal P1 via the resistors R1-R4. This electrical current path reduces the spike voltage generated in each coil LU, LV, LW when the connections between each coil LU, LV, LW and the power supply line ISO3V turn from on to off accompanying the rectifying operation, and therefore the electrical current is drawn from the terminals U, V, W to the common terminal P1.

For example, when the electrical current flows from the coil LU to the power supply line ISO3V via the transistor Tr11 in the on state, the voltage of the terminal U decreases and the transistor Tr11 goes to the off state, upon which spike voltage is generated in the terminal U due to the back electromotive force of the coil LU. At this time, because the electrical current flows by a path consisting of the terminal U, switch SW3, resistor R1, resistor R4, switch SW3, and terminal P1, said spike voltage is suppressed. The spike voltage generated in the other terminals V, W also is suppressed by the retraction damping resistance section 34 in the same manner as in the case of the terminal U.

Next, the circuits of the parts pertaining to driving and control of the voice coil motor M2 in the disk drive device shown in FIG. 1 will be explained referring to FIG. 3.

The voice coil motor M2 moves an arm, on which is mounted a head for reading from and writing to a disk-like recording medium, forward and backward. The voice coil motor M2 operates according to voltage applied to terminals VCA, VCB.

The motor drive section 30 drives the voice coil motor M2 based on electric power supplied to the power supply lines ISO3V, VGND.

Figure 3:
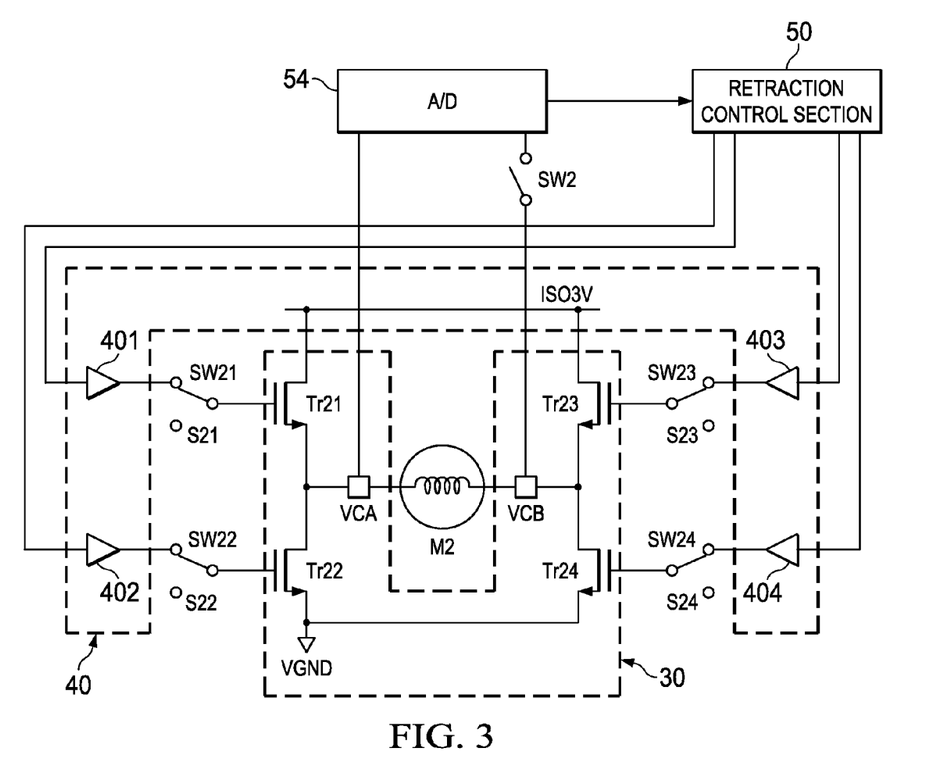
FIG. 3 is a drawing showing one example of the circuit configuration of the part pertaining to driving and control of the voice coil motor in the disk drive device shown in FIG. 1.

The motor drive section 30, for example as shown in FIG. 3, has transistors Tr21-Tr24 such as n-type MOSFETs. The transistors Tr21-Tr24 connect the terminals VGA, VCB to the power supply line ISO3V or the ground line VGND according to gate drive signals input via the signal selection circuit 44 to be described later.

The transistor Tr21 is provided on a path connecting the terminal VCA and the power supply line ISO3V. The transistor Tr22 is provided on a path connecting the terminal VCA and the ground line VGND. The transistor Tr23 is provided on a path connecting the terminal VCB and the power supply line ISO3V. The transistor Tr24 is provided on a path connecting the terminal VCB and the ground line VGND.

During the retraction operation, the transistor drive section 40 outputs drive signals for each gate of the transistors Tr21-Tr24 according to control by the retraction control section 50. The transistors Tr21-Tr24 turn on/off according to the drive signals of the transistor drive section 40, whereby electric power is supplied from the power supply lines ISO3V, VGND to the voice coil motor M2, and the voice coil motor M2 moves the arm in the direction of retraction.

The transistor drive section 40, for example as shown in FIG. 3, has gate drive circuits 401-404. The gate drive circuit 401 outputs drive signals for the gate of transistor Tr21. The gate drive circuit 402 outputs drive signals for the gate of transistor Tr22. The gate drive circuit 403 outputs drive signals for the gate of transistor Tr23. The gate drive circuit 404 outputs drive signals for the gate of transistor Tr24.

During normal operation the transistor drive section 42 outputs drive signals of the transistors T21-Tr24 according to control signals of a control section not illustrated. The transistors Tr21-Tr24 turn on/off according to the drive signals of the transistor drive section 42, whereby electric power is supplied from the power supply lines ISO3V, VGND to the voice coil motor M2, and the voice coil motor M2 moves the arm forward or backward.

During normal operation the signal selection circuit 44 inputs drive signals S21-S24 generated by the transistor drive section 42 to the transistors Tr21-Tr24 of the motor drive section 30, and during the retraction operation it inputs the drive signals generated by the gate drive circuits 401-404 of the transistor drive section 40 to the transistors Tr21-Tr24.

The signal selection circuit 44, for example as shown in FIG. 3, has switches SW21-SW24. The switch SW21 inputs the drive signals of the gate drive circuit 401 or the drive signals S21 of the transistor drive section 42 to the gate of transistor Tr21. The switch SW22 inputs the drive signals of the gate drive circuit 402 or the drive signals S22 of the transistor drive section 42 to the gate of transistor Tr22. The switch SW23 inputs the drive signals of the gate drive circuit 403 or the drive signals S23 of the transistor drive section 42 to the gate of transistor Tr23. The switch SW24 inputs the drive signals of the gate drive circuit 404 or the drive signals S24 of the transistor drive section 42 to the gate of transistor Tr24.

During the period when the supply of drive voltage from the power supply lines ISO3V, VGND to the voice coil motor M2 is interrupted, the analog-digital conversion circuit 54 inputs the voltage between the terminals VCA and VCB, converts that sample-hold voltage to a digital value, and outputs it to the retraction control section 50. The switch SW2 connects the terminal VCB and the input terminal of the analog-digital conversion circuit 54.

When the transistors Tr21, Tr23, Tr24 are in the off state, the transistor Tr22 is in the on state, and the switch SW2 is in the on state, the analog-digital conversion circuit 54 inputs the back electromotive force generated in the voice coil motor M2, and converts it to a digital value. The size of this back electromotive force depends on the speed with which the arm is driven by the voice coil motor M2.

Here, the operation of the transistors Tr21-Tr24 is controlled by the retraction control section 50, and the switch SW2 is also controlled on/off by the control signals from the retraction control section 50. As will be described later, the transistors Tr21-Tr24 are controlled by the retraction control section 50 such that the speed of the arm is kept within a prescribed range, while the supply of drive voltage to the voice coil motor M2 and the measurement of back electromotive force by the analog-digital conversion circuit 54 occur repeatedly.

Next, the power supply system and control system in the disk drive device pertaining to this embodiment will be explained returning to FIG. 1.

The transistor Tr1 connects a power supply line P3P3V, to which a voltage (for example 3.3V) is applied from an external power supply (not illustrated), to the internal power supply line ISO3V. The transistor drive circuit 52 turns the transistor Tr1 on during normal operation and turns the transistor Tr1 off during the retraction operation, according to control signals from the retraction control section 50. In this way, the internal power supply line ISO3V is connected to the power supply line P3P3V during normal operation, and is disconnected from the power supply line P3P3V during the retraction operation.

The anode of the diode D1 is connected to the power supply line P3P3V, and its cathode is connected to the power supply line ISO3V. In this way, it becomes possible to supply electric power from the power supply line P3P3V to the power supply line ISO3 via diode D1 when the external power supply has not been interrupted during the retraction operation.

The capacitor C10 is connected between the power supply line ISO3V and the ground line VGND, and it maintains the power supply voltage supplied to the motors (M1, M2), etc., during the retraction operation.

The clamping circuit 64 is connected between the power supply line ISO3V and the ground line VGND, and it performs clamping such that the power supply voltage does not exceed a prescribed upper limit value.

During normal operation, the charge pump circuit 16 increases the voltage of the power supply line P3P3V connected to the external power supply. The charge pump circuit 16, for example, raises the 3.3V voltage of the power supply line P3P3V to 8V. The capacitor C11 is connected between the terminal V8 and the ground line VGND, and it receives the voltage increased by the charge pump circuit 16 as input.

The switch SW1 is provided between the output of the charge pump circuit 16 and the terminal V8, and it is controlled on/off by the retraction control section 50. That is, the switch SW1 turns on during normal operation and turns off during the retraction operation.

When the switch SW1 is in the on state during normal operation, the regulator circuit 62 generates about 6V voltage based on the output voltage of the charge pump circuit 61. On the other hand, when the switch SW1 is in the off state during the retraction operation, the regulator circuit 62 goes to the off state, and the terminal V8 and the terminal V6 are electrically disconnected.

The capacitor C12 is connected between the terminal V6 and the ground line VGND, and it inputs the 6V voltage generated in the regulator circuit 62.

The 6V voltage of terminal V6 is used for circuit driving (for example driving the transistors of the motor drive sections 10, 30) during the retraction operation.

The regulator circuit 63 generates a power supply voltage and a baseline voltage for the circuits used during the retraction operation. For example, the regulator circuit 63 has a power supply circuit for analog circuits, a power supply circuit for digital circuits, and a band gap circuit which generates a baseline voltage. The regulator circuit 63 is constituted to operate with lower power consumption compared to the power supply circuits used during normal operation.

The transistor Tr2 is connected between the terminal V8 and the power supply line ISO3V. The transistor drive circuit 53 applies a prescribed voltage Vg to the gate of transistor Tr2 during the retraction operation according to control by the retraction control section 50.

When the voltage Vg is applied to the gate of transistor Tr2, transistor Tr2 becomes conductive and charge current flows from the capacitor C11 of the terminal V8 to the capacitor C10 of the power supply line ISO3V. When the difference between the voltage of the power supply line ISO3V and the output voltage Vg of the transistor drive circuit 53 becomes smaller than a threshold voltage Vt of the transistor Tr2 from charging of the capacitor C10, the transistor Tr2 turns off and charging is stopped. In this way, when the voltage of the capacitor C11 is sufficiently high compared to the voltage of the power supply line ISO3V, the power supply line ISO3V is maintained at a prescribed voltage Vm (=Vg−Vt).

When an abnormality of power supply voltage, environmental temperature, rotational speed of the spindle motor 30, or the like, is detected, the retraction control section 50 controls each circuit of the disk drive device such that the retraction operation is performed.

When starting the retraction operation, the retraction control section 50 sets the transistor Tr1 to off and cuts off the internal power supply line ISO3V from the power supply line P3P3V, and also sets the switch SW1 to off and cuts off the capacitor C11 from the output of the charge pump circuit 61. Also, the retraction control section 50 controls the signal selection circuit 24 for inputting the drive signals of the transistor drive section 20 to the motor drive section 10, and also controls the signal selection circuit 44 for inputting the drive signals of the transistor drive section 40 to the motor drive section 30.

Also, the retraction control section 50 controls the transistor drive section 40 to supply drive voltage to the voice coil motor M2, and it moves the arm in the direction of retraction. At this time, the retraction control section 50 acquires measurements of back electromotive force from the analog-digital conversion circuit 54, as needed, and controls the polarity of drive voltage and the timing of application (duty) according to those measurements, performing control such that the speed of the arm is kept within a prescribed range.

Although the power supply voltage of the power supply line ISO3V is decreased by driving the voice coil motor M2, at this time, the retraction control section 50 controls the transistor drive circuit 53 such that the prescribed voltage Vg is applied to the gate of the transistor Tr2, and the capacitor C10 is charged by the charge of the capacitor C11, whereby the decrease in power supply voltage is suppressed.

Also, the retraction control section 50 controls the transistor drive section 20 such that the back electromotive force produced by the inertial rotation of the spindle motor M1 is rectified and is output to the power supply lines ISO3V, VGND. In this case, the retraction control section 50 alternates between the rectifying mode and the short-circuit mode, whereby it increases the back electromotive force of the spindle motor M1 and outputs it to the power supply line ISO3V.

Here, the disk drive device pertaining to the embodiment constituted as described above will be explained, focusing on the operation during retraction.

In normal operation, transistor Tr1 is turned on, and voltage (3.3V) from the external power supply is supplied to the internal power supply line ISO3V via the power supply line P3P3V. At this time, the switch SW1 is turned on, and capacitor C11 is charged to 8V by the charge pump circuit 61.

Also, in normal operation, the drive signals of the transistor drive section 22 are input to the motor drive section 10 via the signal selection circuit 24, and the drive signals of the transistor drive section 42 are input to the motor drive section 30 via the signal selection circuit 44. In this way, each transistor Tr11-Tr16, Tr21-Tr24 of the motor drive sections 10 and 20 are controlled on/off by the control sections (not illustrated), and the rotation of the spindle motor M1 and the forward and backward movement of the voice coil motor M2 are controlled.

When an abnormality of the rotational speed of spindle motor M1 or the power supply voltage, etc., is detected during this normal operation, the retraction operation is started. Transistor Tr1 is turned off by the control of the retraction control section 50. In this way, the power supply line P3P3V connected to the external power supply is disconnected from the internal power supply line ISO3V, and therefore there is no flow of electrical current from the power supply line ISO3V to the power supply line P3P3V, even when the voltage of the external power supply has decreased, for example. Also, because the switch SW1 is turned off at this time, the charge of the capacitor C11 is prevented from being discharged to the power supply line P3P3V via the charge pump circuit 61.

When the switch SW1 turns off, the regulator circuit 62 stops operation, and the terminals V8 and V6 are isolated from each other. The regulator circuit 63 generates the power supply voltage for each circuit (retraction control section 50, clock generation circuit, etc.) pertaining to the retraction operation based on the output voltage of the capacitor C12.

During the retraction operation, the drive signals of the transistor drive section 20 are selected by the signal selection circuit 24 and input to the motor drive section 10. In this way, the state of conduction of each transistor Tr11-Tr16 of the motor drive section 10 for driving spindle motor M1 is controlled by the retraction control section 50.

Also at this time, the drive signals of the transistor drive section 42 are selected by the signal selection circuit 44 and input to the motor drive section 30. In this way, each transistor Tr21-Tr24 of the motor drive section 30 for driving the voice coil motor M2 is controlled on/off by the retraction control section 50.

When retraction is started, the transistors Tr22, Tr24 on the low side of the motor drive section 30 are turned on first to set the electrical current flow to the voice coil motor M2 to zero, the transistors Tr21, Tr23 on the high side are turned off, and the input terminals VCA, VCB of the voice coil motor M2 are short-circuited to the ground line VGND. It is also possible to control the movement of the head by applying a brake to the voice coil motor M2.

Next, drive voltage is applied to the voice coil motor M2 so as to move the arm in the direction of retraction.

For example, if the polarity wherein the voltage of the terminal VCB is higher than that of terminal VCA is "positive" and the polarity opposite this is "negative," the arm is moved in the direction of retraction by applying a positive drive voltage. In this case, in order to move the arm in the direction of retraction, the transistors Tr23 and Tr22 are turned on, and the transistors Tr21 and Tr24 are turned off. In this way, the terminal VCB is connected to the power supply line ISO3V, and the terminal VCA is connected to the ground line VGND.

After the positive voltage is applied to the voice coil motor M2 for a fixed time, the back electromotive force generated between the terminals VCA and VCB is detected in the analog-digital conversion circuit 54. That is, the transistors Tr21 Tr23, Tr24 are turned off, and the supply of drive voltage to the voice coil motor M2 is stopped. Also, the transistor Tr22 is turned on, and the terminal VCA is connected to the ground line VGND. In this state, the switch SW2 is turned on, and the back electromotive force generated between the terminal VCA and the terminal VCB is input to the analog-digital conversion circuit 54. The voltage across the terminals VCA and VCB is sampled in the analog-digital conversion circuit 54 and the result of that digital conversion is input to the retraction control section 50.

Based on the digital value input from the analog-digital conversion circuit 54, the retraction control section 50 regulates the polarity of the drive voltage of the voice coil motor M2 and the timing of its application such that the speed of the arm is kept within a fixed range.

For example, when the digital value indicates that the speed of the arm has not reached the fixed range, positive drive voltage is input to the voice coil motor M2 for a fixed time in order to further accelerate the arm. In this case, in the same manner as described above, the transistors Tr23 and Tr22 are turned on, and the transistors Tr21 and Tr24 are turned off. On the other hand, when the digital value indicates that the speed of the arm has exceeded the fixed range, negative voltage is input to the voice coil motor M2 for a fixed time in order to decelerate the arm. In this case, the transistors Tr21 and Tr24 are turned on, and the transistors Tr22 and Tr23 are turned off. When the digital value indicates that the speed of the arm is within the fixed range, the state is maintained in which the supply of drive voltage is stopped, and measurement of the back electromotive force by the analog-digital conversion circuit 54 is repeated.

Figure 4:
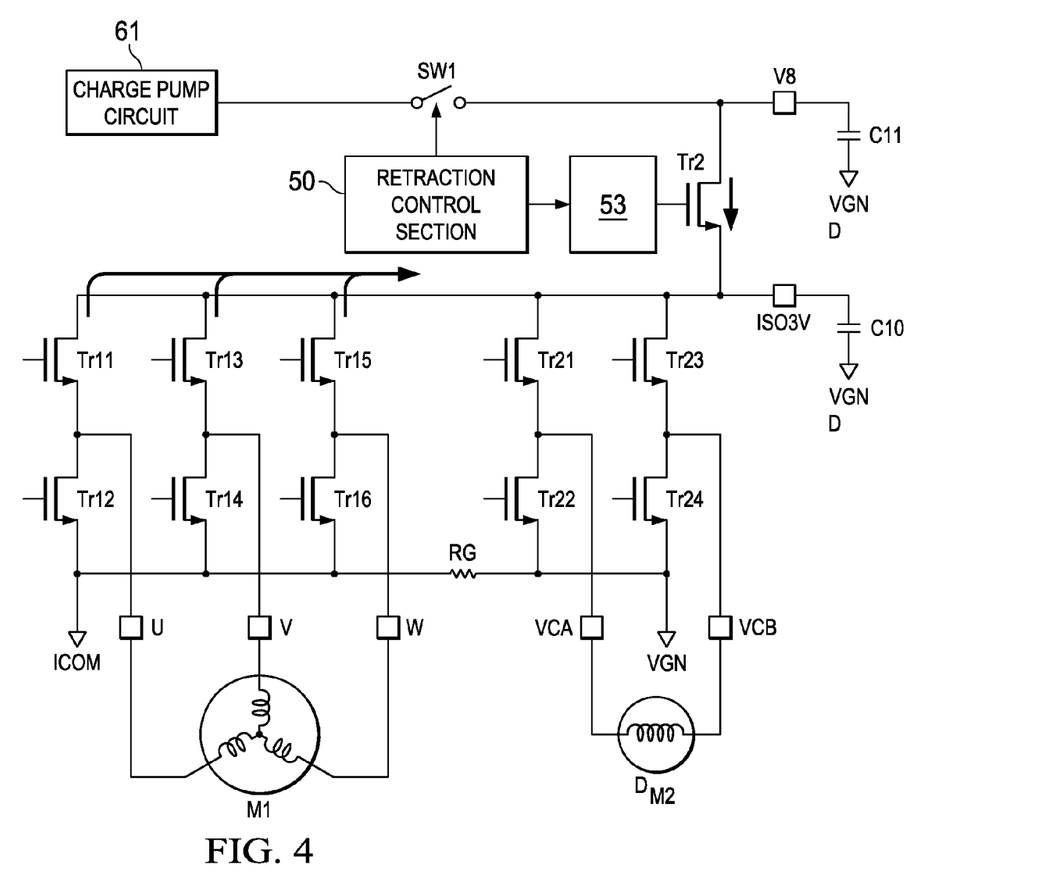
FIG. 4 is a drawing showing the main components of the circuits pertaining to driving of the voice coil motor and the spindle motor in the disk drive device shown in FIG. 1.

Incidentally, when the voice coil motor M2 is driven in said manner, the charge of capacitor C10 is discharged by its power consumption, and the power supply voltage of the power supply line ISO3V decreases. Therefore, as shown in FIG. 4, the 8V voltage of the capacitor C11 is used for charging the capacitor C10 during the retraction operation. That is, by control of the retraction control section 50, a prescribed voltage Vg is supplied from the transistor drive circuit 53 to the transistor Tr2, and the transistor Tr2 is made conductive. Because the charge of the capacitor C11 flows to the capacitor C10 via the transistor Tr2, the power supply voltage of the power supply line ISO3V is kept to a fixed voltage Vm that is lower than the output voltage Vg of the transistor drive circuit 53 by the amount of the threshold voltage Vt of the transistor Tr2.

However, when the charge of the capacitor C11 continues to be decreased by discharging, said voltage Vim which is regulated by the output voltage Vg of the transistor drive circuit 53 and the threshold voltage Vt, is no longer maintained. Therefore, in the disk drive device pertaining to this embodiment, in order to suppress the power supply voltage decrease of the power supply line ISO3V accompanying the voltage decrease of the capacitor C11, as shown in FIG. 4, the rectifying operation is performed in which the back electromotive force of the spindle motor M1 is commutated and output to the power supply lines ISO3V, VGND.

For example, the drive device pertaining to this embodiment can perform commutation of back electromotive force by two methods.

In the first rectifying method, the transistor drive section 20 always operates in the rectifying mode. In this case, the terminal having the highest voltage among the three terminals U, V, W of the spindle motor M1 and having a higher voltage than the power supply line ISO3V is connected to the power supply line ISO3V. Also, the terminal having the lowest voltage among the three terminals U, V, W and having a lower voltage than the terminal ICOM is connected to the terminal ICOM.

On the other hand, in the second rectifying method, the transistor drive section 20 operates alternately in the short-circuit mode and the rectifying mode. In the short-circuit mode, the three terminals U, V, W of the spindle motor M1 are short-circuited to the ground line VGND. In this way, electrical current according to the back electromotive force accompanying rotation and the conductor resistance of each coil flows to the three coils LU. LV, LW. When the short-circuit mode is released and the rectifying mode is initiated, the magnetic energy accumulated in each coil becomes a surge voltage and is output to the power supply lines ISO3V, VGND, and therefore a rectification voltage is generated that is higher than in the first rectifying method.

In the drive device pertaining to this embodiment, the transistor drive section 20 is controlled, for example, such that commutation by said rectifying method becomes possible from the start of the retraction operation. In the initial period of the retraction operation, the voltage of the power supply line ISO3V is maintained by the current of the capacitor C11, and the voltage of the power supply line is higher than that at the three terminals U, V, W of the spindle motor M1, and therefore commutation of back electromotive force cannot be performed. Also, at this time there is no input of electric power from the power supply line ISO3V to the spindle motor M1. When the voltage of the power supply line ISO3V decreases accompanying discharge of the capacitor C11 and the voltage of the power supply line ISO3V becomes lower than that of the three terminals U, V, W of the spindle motor M1, the operation of rectifying back electromotive force is started automatically.

Figure 5:
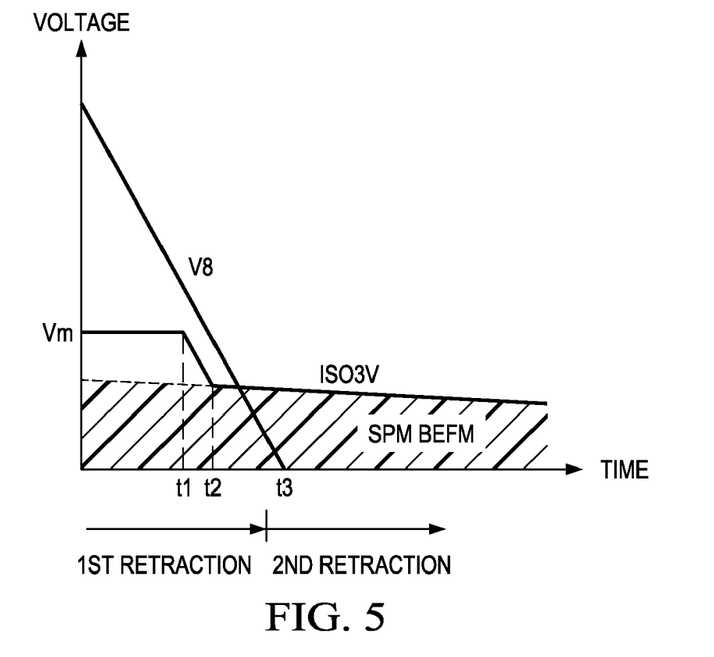
FIG. 5 is a graph showing the change of capacitor voltage and power supply line voltage for supplying drive power during the retraction operation.

FIG. 5 is a graph showing the change of voltage V8 of the capacitor C11 and voltage of the power supply line ISO3V during the retraction operation. The shaded area of the graph indicates the rectified voltage of the back electromotive force of the spindle motor M1.

When the voltage V8 of the capacitor C11 is decreased by discharging and becomes "Vin+Vt" at time t1, the voltage of the power supply line ISO3V decreases in linkage with the voltage of the capacitor C11.

At time t2, when the voltage of the power supply line ISO3V becomes lower than the voltage of the terminals U, V, W of the spindle motor M1, the state of conduction of each transistor of the motor drive section 10 is controlled such that the back electromotive force of the spindle motor M1 is rectified and is output to the power supply line ISO3V. In this way, the voltage decrease of the power supply line ISO3V linked with the voltage decrease of the capacitor C11 is suppressed. The voice coil motor M2 is driven stably based on the back electromotive force of the spindle motor M1.

Figure 6:
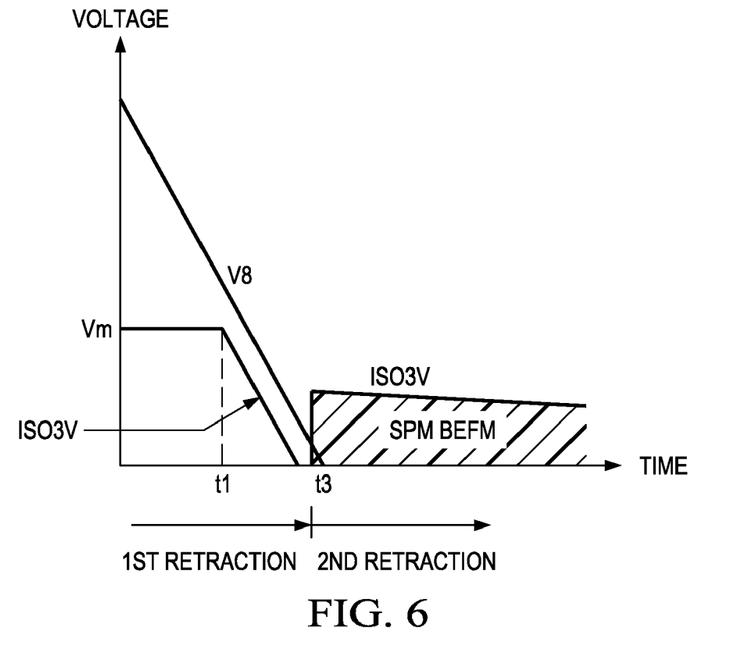
FIG. 6 is a graph for explaining the case when commutation of the hack electromotive force of the spindle motor is not performed until a fixed time passes.

FIG. 6 is a graph illustrating the case in which commutation of back electromotive force of the spindle motor M1 is not performed until a fixed time elapses. This corresponds to the conventional method in which the method of power supply to the voice coil motor is switched according to a preset timer value.

In the example in FIG. 6, because commutation of back electromotive force of the spindle motor M1 is not performed until a preset time t3 is reached, the voltage of the power supply line ISO3V has fallen to zero volts before then. When the power supply line ISO3V becomes zero volts and drive power is no longer supplied to the voice coil motor M2, the torque of the voice coil motor M2 decreases, and therefore there is a possibility that the arm will return to the side of the disk as a result of impact, etc. In the drive device pertaining to this embodiment, the commutation of hack electromotive force is not started based on a timer value as shown in FIG. 6, rather, the commutation of back electromotive force is started automatically according to the voltage decrease of the power supply line IS03V as shown in FIG. 5. Therefore, the problem due to torque decrease of the voice coil motor M2 as described above is avoided.

Next are shown examples of waveforms at each node found by simulation of the respective cases of the first rectifying method and the second rectifying method described above.

Figure 7:
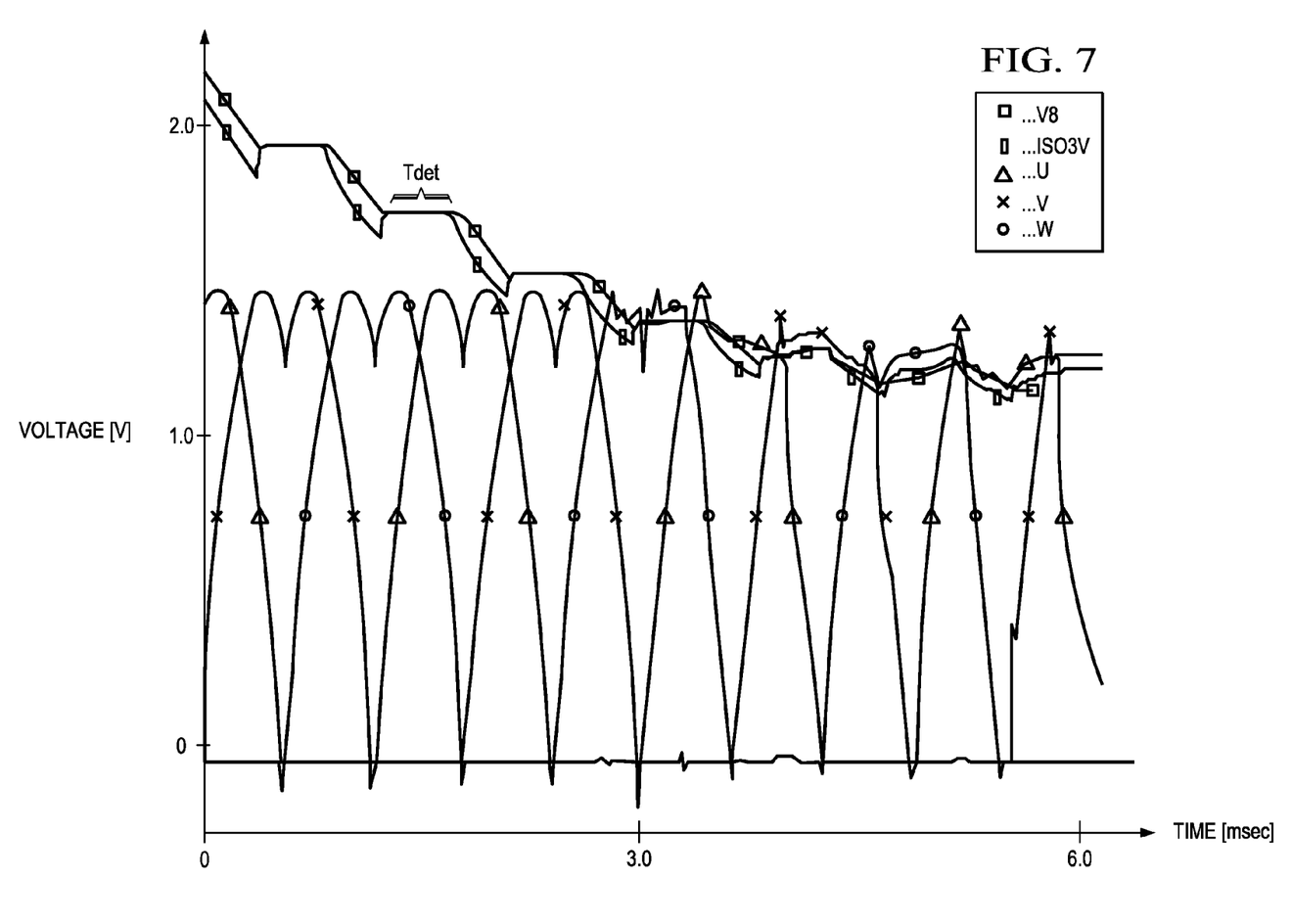
FIG. 7 is a graph showing an example of simulated waveforms of capacitor voltage, power supply line voltage, and spindle motor terminal voltage for supplying drive power in a first rectifying method.

FIG. 7 is a graph showing an example of simulated waveforms for voltage V8 of the capacitor C11, the voltage of the power supply line ISO3V, and the terminal voltages U, V, W for the spindle motor M1 in the first rectifying method.

In the example in FIG. 7, the rectifying operation has started at near 3 msec, whereby the rate of the voltage decrease of the power supply line ISO3V has become more gradual.

Furthermore, in FIG. 7, the period Tdet in which the voltage of the power supply line ISO3V and the voltage V8 of the capacitor C11 become virtually equal appears repeatedly, but this corresponds to the period in which the supply of drive voltage to the voice coil motor M2 stops and the measurement of back electromotive force begins. In this period, because almost no electrical current flows to the voice coil motor M2, the voltage drop of the transistor Tr2 has become smaller.

Figure 8:
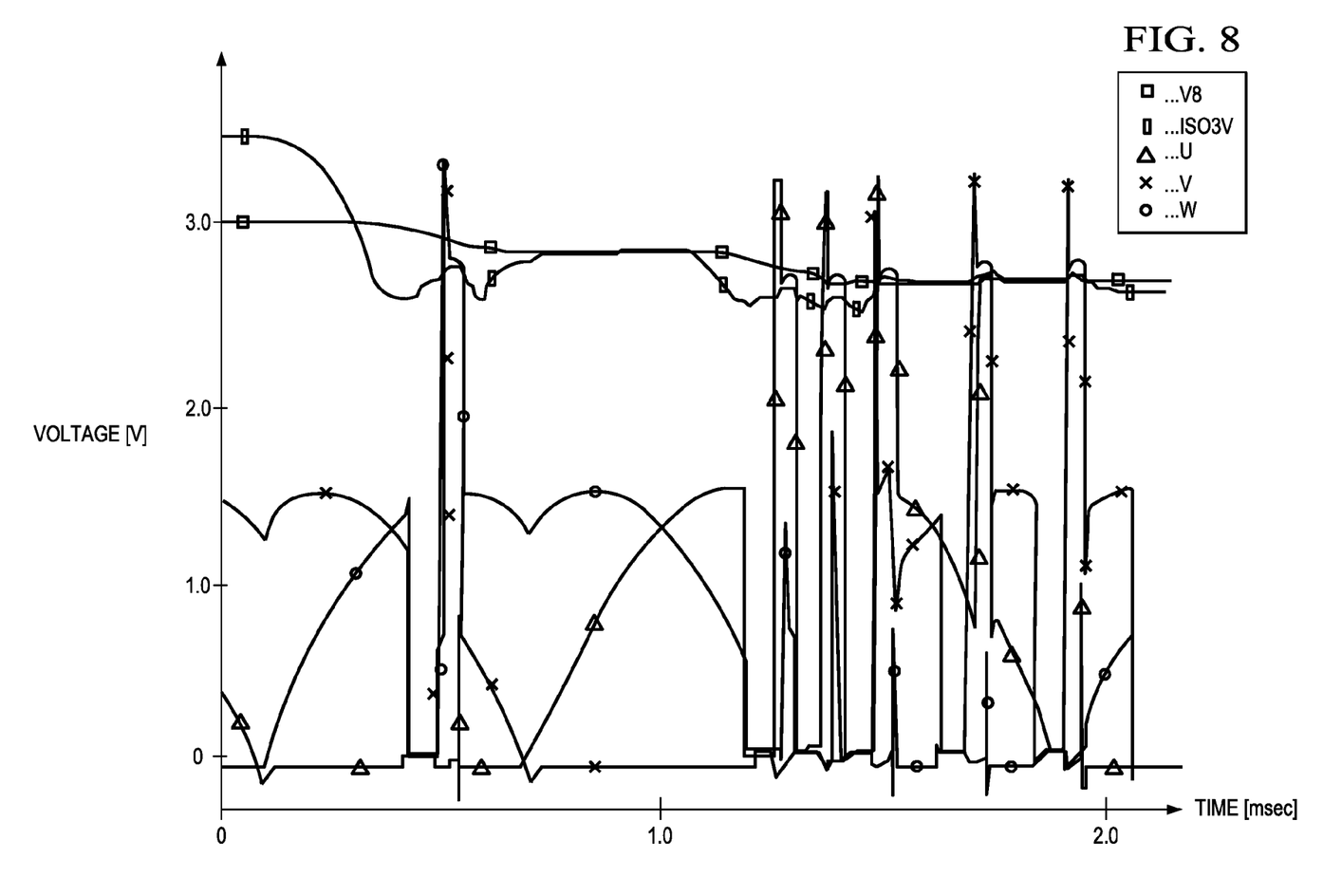
FIG. 8 is a graph showing an example of simulated waveforms of capacitor voltage, power supply line voltage, and spindle motor terminal voltage for supplying drive power in a second rectifying method.

FIG. 8 is a graph showing an example of simulated waveforms for voltage V8 of the capacitor C11, the voltage of the power supply line ISO3V, and the terminal voltages U, V, W for the spindle motor M1 in the second rectifying method.

The terminal voltage U, V, W due to back electromotive force is about 1.4V at the peak, but the terminal voltage U, V, W when moving from the short-circuit mode to the rectifying mode rises up to nearly 3V. In this way, the voltage of the power supply line ISO3V becomes higher, up to nearly 3V, in the second rectifying method.

As explained above, in the retraction operation according to this embodiment, each transistor Tr11-Tr16 of the motor drive section 10 is controlled so as to commutate the back electromotive force of the spindle motor M1 and output it to the power supply lines ISO3V, VGND (or ICOM), while disconnecting the spindle motor M1 from the electric power of power supply line ISO3V. In this way, when the voltage of the power supply lines ISO3V, VGND becomes lower than the rectified voltage of the back electromotive force, the rectified voltage is output to the power supply lines ISO3V, VGND automatically, thus avoiding the problem of the voltage of the power supply lines ISO3V, VGND decreasing temporarily and no longer being able to supply drive voltage to the voice coil motor M2, as in the conventional device which switches the power supply method by referring to a timer value.

Also, this embodiment provides for alternation between a short-circuit mode, which short-circuits each terminal U, V, W of the spindle motor M1 to the terminal ICOM, and a rectifying mode, which rectifies the back electromotive force of the spindle motor M1 and outputs it to the power supply lines ISO3V, VGND while blocking the input of electric power from the power supply lines ISO3V, VGND (or ICOM) to the spindle motor M1. In this way, it becomes possible to output a higher voltage to the power supply lines ISO3V, VGND compared to the case when directly rectifying the back electromotive force of the pindle motor M1.

In general, the back electromotive force of the spindle motor of a hard disk drive device tends to become smaller as the disk size becomes smaller. When the back electromotive force is small, the rectified voltage also becomes small, and therefore it becomes difficult to supply sufficient voltage to the voice coil motor for the retraction operation. With the conventional device, it was necessary in this case to increase the capacitance of the capacitor in order to obtain sufficient drive time.

According to this embodiment, it is possible to generate greater voltage than that of the back electromotive force of the spindle motor by alternating between a short-circuit mode and a rectifying mode, and therefore even when the back electromotive force of the spindle motor is small, it is possible to limit the increase of capacitance of the capacitor.

Also, according to this embodiment, because the rate of voltage reduction of the power supply line ISO3V is made relatively smaller by generating greater voltage than that of the back electromotive force of the spindle motor M1, the voice coil motor M2 can be driven for a long time. In this way, because the time for driving the voice coil motor M2 in order to park the head in the safety region can be made longer, any bouncing back of the head from the safety region can be effectively prevented.

Furthermore, according to this embodiment, because the voice coil motor M2 is controlled such that the speed of the arm is kept within a prescribed range during the retraction operation, the motor drive power can be reduced compared to the method that continues to input a fixed voltage to the voice coil motor. In this way, it is possible to limit the capacitance of the capacitor C11 for supplying drive power to the voice coil motor in the retraction operation.

Some embodiments of this invention have been explained above, but this invention is not limited to only said embodiments, and it can include many variations.

For example, in another embodiment of this invention, the first rectifying method and the second rectifying method described above can also be switched according to the voltage of the power supply lines ISO3V, VGND (or ICOM). For example, the retraction control section 50 can monitor the voltage of the power supply lines ISO3V, VGND (or ICOM) by means of a voltage sensing circuit, and can commutate using said second rectifying method when this voltage becomes lower than a prescribed threshold.

In this way, the charge of the capacitor C11 is mainly used for driving the voice coil motor M2 in the first half of retraction, and at the point where the voltage of the capacitor C11 drops below a fixed level, the back electromotive force of the spindle motor M1 is used for driving the voice coil motor M2.

Also, in another embodiment of this invention, the time for application of drive voltage input to the voice coil motor M2 can be changed according to a digital value of the analog-digital conversion circuit 54. That is, it can be configured such that the time for application of drive voltage increases as the error with respect to a standard value for the speed of the arm increases.

The invention claimed is:

1. A disk drive device comprising:
- A. a spindle motor having first, second, and third winding terminals;
- B. a voice coil motor having first and second coil terminals;
- C. a power lead;
- D. a common lead;
- E. first, second, and third pairs of spindle motor transistors connected between the power lead and the common lead, each pair of spindle motor transistors having a lead connected to one of the first, second, and third winding terminals;
- F. first and second pairs of voice coil motor transistors connected between the power lead and the common lead, each pair of voice coil motor transistors having a lead connected to one of the first and second coil terminals;
- G. a first capacitor connected between the power lead and the common lead;
- H. a charge pump having an output;
- I. a second capacitor having a first lead selectively coupled to the output of the charge pump and a second lead connected to the common lead; and
- J. a transistor connected between the first lead of the second capacitor and the power lead.

2. The device of claim 1 in which the transistor has a gate lead and including a switch connected between the output of the charge pump and the first lead of the second capacitor and having a control input, and including retraction control circuitry having an output connected to the input of the gate lead and an output connected to the control input of the switch.

* * * * *